United States Patent [19]

Brown et al.

[11] Patent Number: 5,758,737
[45] Date of Patent: Jun. 2, 1998

[54] SEAT BELT POSITIONING APPARATUS AND METHOD OF USE

[75] Inventors: Louis R. Brown, Oxford; Scott B. Gentry, Romeo, both of Mich.

[73] Assignees: TRW Inc.; TRW Vehicle Safety Systems, both of Lyndhurst, Ohio

[21] Appl. No.: 762,602

[22] Filed: Dec. 9, 1996

[51] Int. Cl.⁶ .................. B60R 22/48; B60R 22/20
[52] U.S. Cl. .................. 180/268; 280/801.2; 340/457.1
[58] Field of Search .................. 280/801.2, 808, 280/806; 180/268; 297/483, 480; 340/457.1

[56] References Cited

U.S. PATENT DOCUMENTS

| | | |
|---|---|---|
| 3,588,811 | 6/1971 | Prickett . |
| 3,934,671 | 1/1976 | Hart .................. 180/270 |
| 4,039,224 | 8/1977 | Bauer et al. .................. 297/469 |
| 4,103,842 | 8/1978 | Martin et al. .................. 242/384 |
| 4,346,778 | 8/1982 | Bluggel et al. .................. 180/268 |
| 4,547,717 | 10/1985 | Radermacher et al. .................. 280/801.2 |
| 4,616,850 | 10/1986 | Sedlmayr .................. 280/801.2 |
| 4,627,639 | 12/1986 | Sedlmayr et al. .................. 280/801.2 |

FOREIGN PATENT DOCUMENTS 2210078  10/1972  Germany .................. 180/268

*Primary Examiner*—Peter C. English
*Attorney, Agent, or Firm*—Tarolli, Sundheim, Covell, Tummino & Szalo

[57] ABSTRACT

A vehicle occupant protection apparatus (10) includes seat belt webbing (12), a field effect device (50) and a field source device (48) which, when energized, provides a field that energizes the field effect device (50). The webbing (12) is movable to a predetermined position in which it extends into the field to affect the field in a predetermined manner. The field effect device (50) has a first output when the webbing (12) is not in the predetermined position and has a second, different output when the webbing (12) is in the predetermined position. The output of the field effect device (50) thus indicates whether or not the webbing (12) is in the predetermined position.

21 Claims, 3 Drawing Sheets

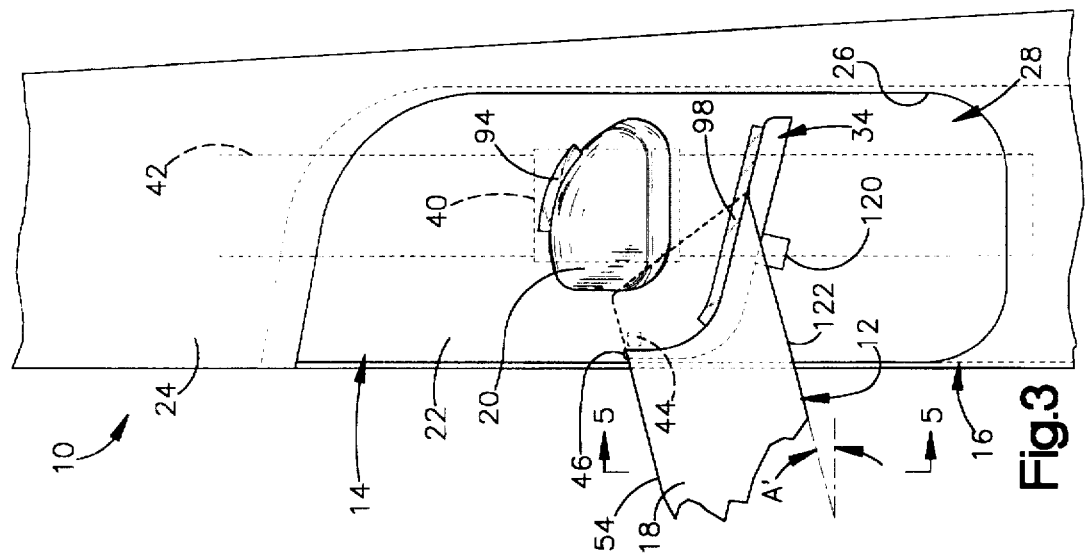
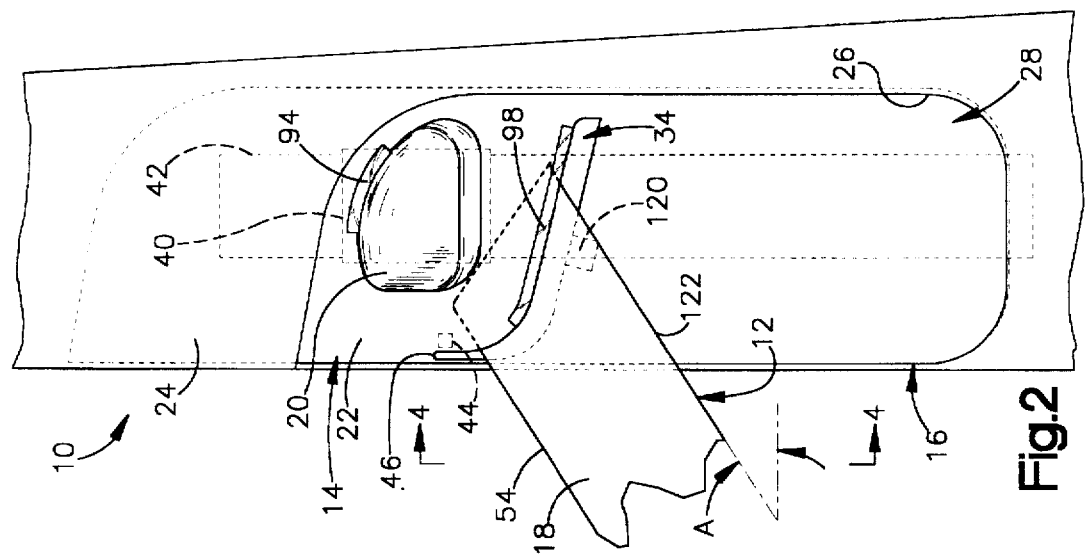
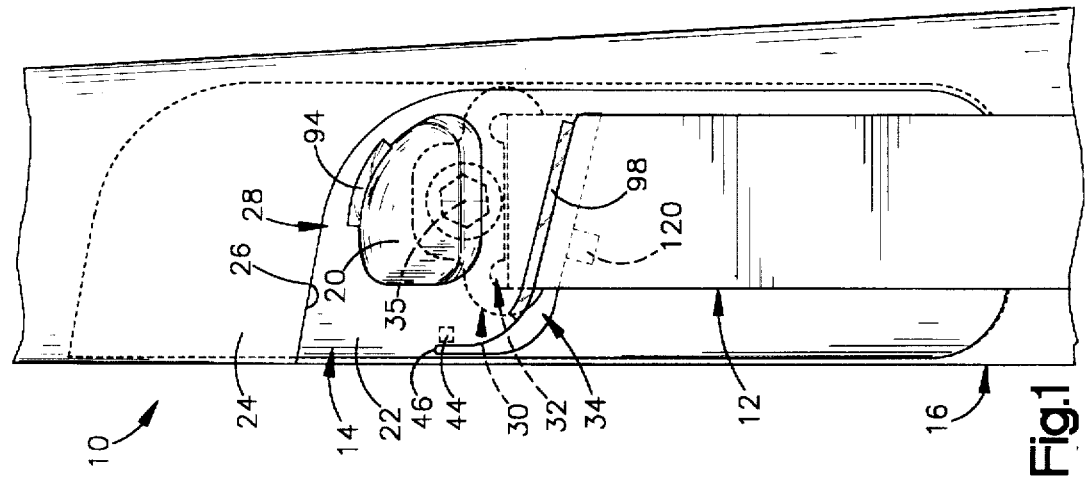

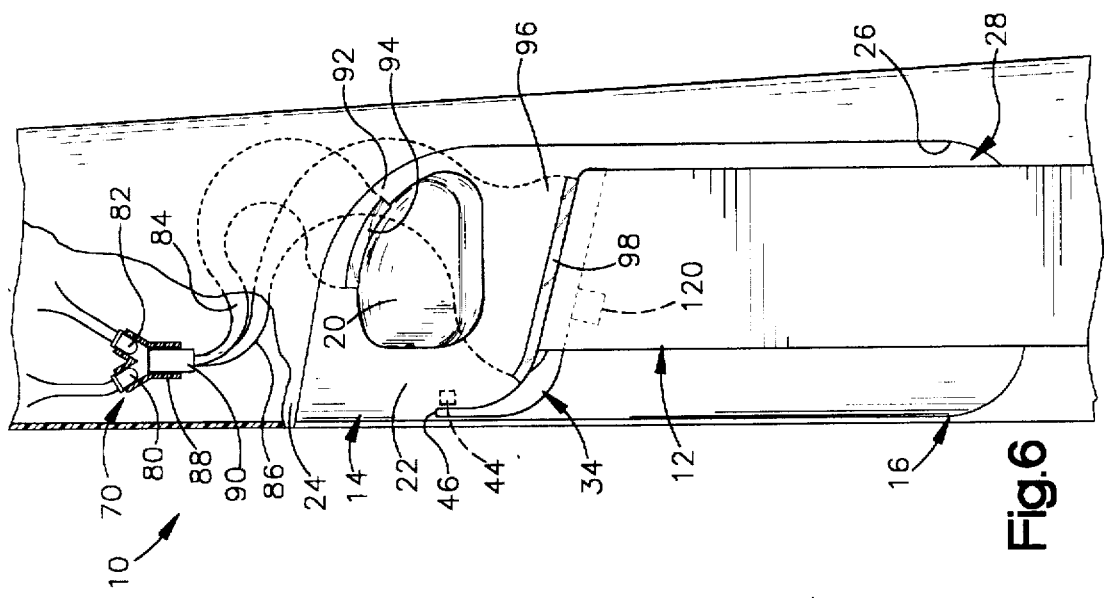
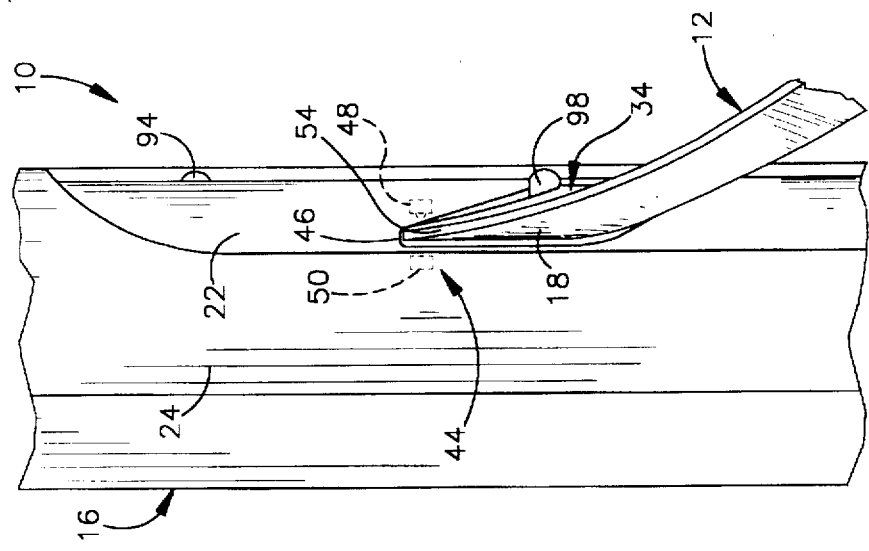
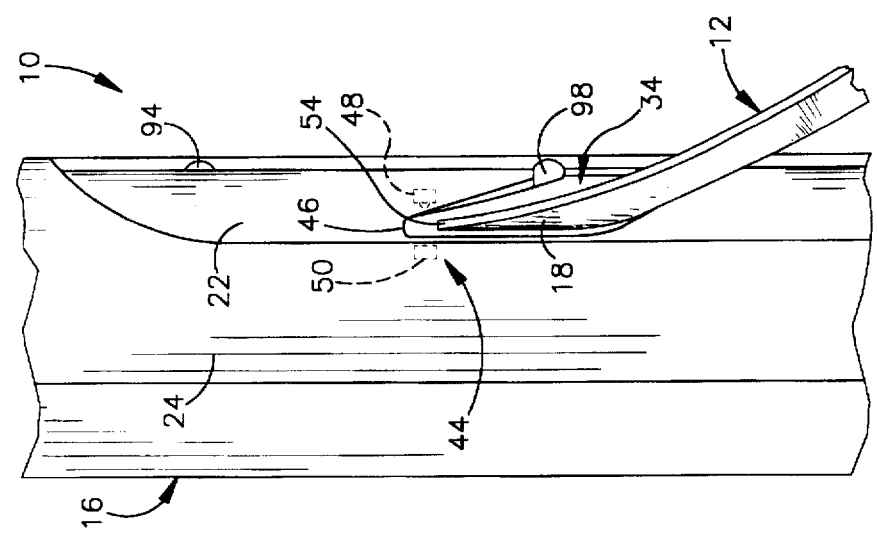

SEAT BELT POSITIONING APPARATUS AND METHOD OF USE

FIELD OF THE INVENTION

The present invention relates to a vehicle occupant protection apparatus including seat belt webbing, and particularly relates to an apparatus for adjusting the position of a shoulder belt section of the webbing.

BACKGROUND OF THE INVENTION

A seat belt system for an occupant of a vehicle typically includes seat belt webbing, a locking tongue on the webbing, and a buckle which is fixed to the vehicle. When the tongue is locked in the buckle, a lap belt section of the webbing extends across the occupant's lap, and a shoulder belt section of the webbing extends across the occupant's torso. The shoulder belt section further ex tends from the occupant's shoulder to a side portion of the vehicle adjacent to the occupant's seat. It may be desirable to adjust the orientation of the shoulder belt section relative to the occupant's shoulder.

SUMMARY OF THE INVENTION

In accordance with the present invention, a vehicle occupant protection apparatus includes seat belt webbing, a field source device and a field effect device. The field source device, when energized, provides a field that energizes the field effect device. The webbing is movable to a predetermined position. When the webbing is in the predetermined position, it extends into the field to affect the field in a predetermined manner.

The field effect device has a first output when the webbing is not in the predetermined position. The webbing affects the field such that the field effect device has a second, different output when the webbing is in the predetermined position. Accordingly, the output of the field effect device indicates whether or not the webbing is in the predetermined position.

In the preferred embodiments of the present invention, a shoulder belt section of the webbing is movable into and out of the field, and has a predetermined orientation relative to a vehicle occupant's shoulder when it is in the predetermined position. In a first embodiment, the apparatus further comprises an indicator system for providing a red or green light signal to alert a vehicle occupant to the position of the shoulder belt section of the webbing. A controller actuates the indicator system in response to the output of the field effect device.

In a second embodiment, a height adjuster for the webbing includes a motorized slider which moves the shoulder belt section of the webbing vertically. A controller in the second embodiment actuates the motorized slider in response to the output of the field effect device.

In the first and second embodiments of the present invention, the field source device is a light source. The field effect device is a photosensitive device which is energized by light emitted from the light source. When the shoulder belt section of the webbing moves into the predetermined position, it shields the photosensitive device from the light source. The shoulder belt section then switches the photosensitive device from a first energized condition in which it has the first output to a second, differently energized condition in which it has the second output. In this manner, the apparatus provides a signal that indicates whether or not the shoulder belt section of the webbing is in the predetermined position, and switches the signal without contact input from the webbing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a partial view of a vehicle occupant protection apparatus comprising a first embodiment of the present invention;

FIG. 2 is a view similar to FIG. 1, with certain parts being omitted and with additional parts being shown schematically;

FIG. 3 is a view similar to FIG. 2 showing parts in different positions;

FIG. 4 is a view taken on line 4—4 of FIG. 2;

FIG. 5 is a view taken on line 5—5 of FIG. 3;

FIG. 6 is a view similar to FIG. 1, with certain parts being omitted and with additional parts being shown;

DESCRIPTION OF PREFERRED EMBODIMENTS

Figure 7:
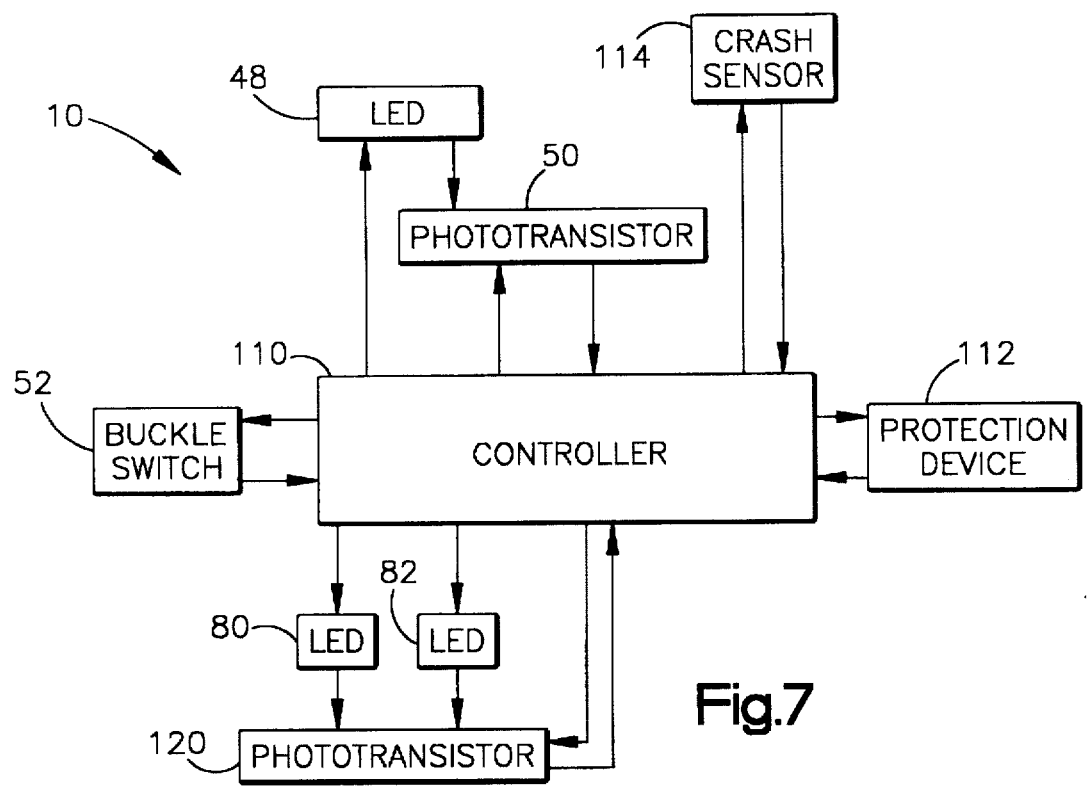
FIG. 7 is a block diagram of parts of the apparatus of FIG. 1.

A vehicle occupant protection apparatus 10 comprising a first embodiment of the present invention is shown partially in FIGS. 1–3. The apparatus 10 includes seat belt webbing 12 and a webbing height adjuster 14 which is mounted on a vehicle pillar 16. When a vehicle occupant is not wearing the webbing 12, a retractor (not shown) holds the webbing 12 in the retracted position of FIG. 1. When a vehicle occupant is wearing the webbing 12, a shoulder belt section 18 of the webbing extends from the height adjuster 14 toward the occupant's shoulder, as shown in FIG. 2. The occupant can then operate the height adjuster 14 to move the shoulder belt section 18 to any one of a plurality of vertically spaced positions defined by the height adjuster 14.

Depending upon the size of the vehicle occupant wearing the webbing 12, one of the vertically spaced positions defined by the height adjuster 14 will be a preferred position for that particular occupant. The preferred position is one in which the shoulder belt section 18 of the webbing 12 is horizontal, or nearly horizontal, between the height adjuster 14 and the occupant's shoulder. For example, the shoulder belt section 18 may initially take the position of FIG. 2 when the webbing 12 is fastened around a vehicle occupant. The shoulder belt section 18 then has a substantially inclined orientation indicated by the angle A. The preferred position of the shoulder belt section 18 for that particular occupant is shown in FIG. 3. The shoulder belt section 18 then has a nearly horizontal orientation, as indicated by the angle A'.

The height adjuster 14 has a recessed actuator button 20 mounted on a trim piece 22. The trim piece 22 is movable vertically within a larger trim piece 24 extending along the height of the pillar 16. An edge surface 26 of the larger trim piece 24 defines a vertically elongated gap 28 in which the webbing 12 and the pushbutton 20 are accessible.

A D-ring 30 (FIG. 1) is located behind the movable trim piece 22. The webbing 12 extends through a slot 32 in the D-ring 30, and extends outward from the height adjuster 14 through a slot 34 in the movable trim piece 22. The D-ring 30 pivots about a horizontal axis 35 when the shoulder belt section 18 of the webbing 12 moves between the positions of FIGS. 1, 2, and 3.

As shown schematically in FIG. 2, the height adjuster 14 includes a slider 40 and a vertically extending track 42. The slider 40 supports the D-ring 30 (FIG. 1), and includes a ratchet mechanism which cooperates with the pushbutton 20 to effect movement of the D-ring 30 vertically between a plurality of predefined positions on the track 42. The slider 40 and the track 42 may have any suitable structure known in the art.

The slot 34 in the movable trim piece 22 has a configuration that turns upward to the left, as viewed in FIGS. 1–3. A field effect apparatus 44 (shown schematically) is located beside the upper end 46 of the slot 34. As shown in FIG. 4, the field effect apparatus 44 includes a field source device 48 and a field effect device 50. When the field source device 48 is energized, it provides a field that energizes the field effect device 50. In the first embodiment of the present invention, the field source device 48 is a source of light and the field effect device 50 is a photosensitive device. The source 48 of light preferably is a light emitting diode (LED). The photosensitive device 50 preferably is a phototransistor. Such devices are known in the art, and can be mounted at the inside of the movable trim piece 22 in any suitable manner.

The LED 48 may be energized so as to generate and emit light, i.e., to provide a light field, continuously when the vehicle is being operated. The LED 48 may alternatively be energized so as to emit light intermittently, such as by flashing and/or by remaining on under certain vehicle conditions or for a predetermined time. For example, the LED 48 in the first embodiment of the present invention is preferably energized when a seat belt buckle switch 52 (FIG. 7) indicates that the webbing 12 is fastened around a vehicle occupant. Moreover, the LED 48 can be pulsed on and off such that a specified code can be modulated on the output of the phototransistor 50. In any case, the phototransistor 50 has a first energized condition with a first output when it is subjected to the light field provided by the LED 48. The phototransistor 50 has a second, differently energized condition with a second, correspondingly different output when it is not subjected to the light field provided by the LED 48. The second output could be a LOW output, or could be an output with a value of zero.

When the height adjuster 14 is being used to move the webbing 12 downward from the position of FIG. 2 toward the position of FIG. 3, the shoulder belt section 18 of the webbing 12 moves along the length of the slot 34 in a direction extending upward to the left, as viewed in FIGS. 2 and 3. An upper edge 54 of the shoulder belt section 18 then moves toward the upper end 46 of the slot 34. As the shoulder belt section 18 approaches the preferred position of FIG. 3, the edge 54 moves beside the field effect apparatus 44. More specifically, the shoulder belt section 18 of the webbing 12 moves upward between the phototransistor 50 and the LED 48, as shown in FIG. 5. The shoulder belt section 18 then shields the phototransistor 50 from the light emitted by the LED 48, and thus switches the phototransistor 50 from the first energized condition to the second energized condition. The corresponding change in the output of the phototransistor 50 indicates that the shoulder belt section 18 has been moved to the preferred position.

The apparatus 10 further includes an indicator system 70, as shown in FIG. 6. The indicator system 70 includes a red LED 80, and green LED 82, and two bundles 84 and 86 of optical fibers. A thin plastic housing 88 contains and supports the LEDs 80 and 82 adjacent to a ferrule 90. The ferrule 90, in turn, contains and supports upper end portions of the bundles 84 and 86 of optical fibers adjacent to the LEDs 80 and 82. A lower end portion 92 of the first bundle 84 of optical fibers is spread out in an array extending along the length of an elongated lens 94 on the movable trim piece 22. A lower end portion 96 of the second bundle 86 of optical fibers is similarly spread out in an array extending along the length of an elongated lens 98 at the upper edge of the slot 34. The lenses 94 and 98 are preferably formed of a plastic material.

As shown schematically in FIG. 7, the red and green LEDs 80 and 82 are operated by a controller 110 in response to the output of the phototransistor 50. The controller 110 first responds to the seat belt buckle switch 52 by energizing the LED 48 in the field effect apparatus 44. The controller 110 then responds to the first output of the phototransistor 50 by energizing the red LED 80. The red light emitted by the red LED 80 is transmitted to the lenses 94 and 98 (FIG. 6) by the bundles 84 and 86 of optical fibers. This indicates to the vehicle occupant that the shoulder belt section 18 of the webbing 12 is not in the preferred position.

If and when the phototransistor 50 is switched from the first condition to the second condition, as described above, the controller 110 responds to the second output of the phototransistor 50 by turning the red LED 80 off and by turning the green LED 82 on. The green light emitted by the green LED 82 is then transmitted to the lenses 94 and 98 by the bundles 84 and 86 of optical fibers to indicate to the vehicle occupant that the shoulder belt section 18 of the webbing 12 is in the preferred position.

In accordance with an additional feature of the present invention, the apparatus 10 further includes a vehicle occupant protection device 112 and a crash sensor 114, as shown schematically in FIG. 7. The crash sensor 114 is a known device that provides the controller 110 with a deployment signal when the protection device 112 is to be deployed. The protection device 112 may be an inflatable device, such as an air bag, but preferably is a seat belt pretensioner. As known in the art, such a protection device can be deployed in any one of a plurality of modes which differ from each other in terms of timing and/or other deployment parameters.

The controller 110 responds to the deployment signal received from the crash sensor 114 by deploying the protection device 112 in a first mode if the phototransistor 50 is providing the first output at that time. The controller 110 alternatively deploys the protection device 112 in a second, different mode if the phototransistor 50 is providing the second output at that time. The mode of deployment may further depend on other parameters monitored by the controller 110 in a known manner, with the output of the phototransistor 50 serving as an additional parameter in accordance with the present invention.

A redundant photosensitive device 120 is preferably included in the apparatus 10 in addition to the phototransistor 50. The photosensitive device 120 also is a phototransistor, and is mounted on the movable trim piece 22 beside the lower edge of the slot 34. When the shoulder belt section 18 of the webbing 12 reaches the preferred position of FIG. 3, a lower edge 122 of the shoulder belt section 18 moves past the phototransistor 120 to expose it to the light emitted from the lens 98 at the upper edge of the slot 34. The shoulder belt section 18 of the webbing 12 thus switches the phototransistor 120 from a first energized condition having a first output to a second, differently energized condition having a second, correspondingly different output. The first output of the phototransistor 120 could be a LOW output, or could be an output with a value of zero. The second output of the phototransistor 120 is a redundant signal for indicating to the controller 110 that the shoulder belt section 18 of the webbing 12 is in the preferred position.

Figure 8:
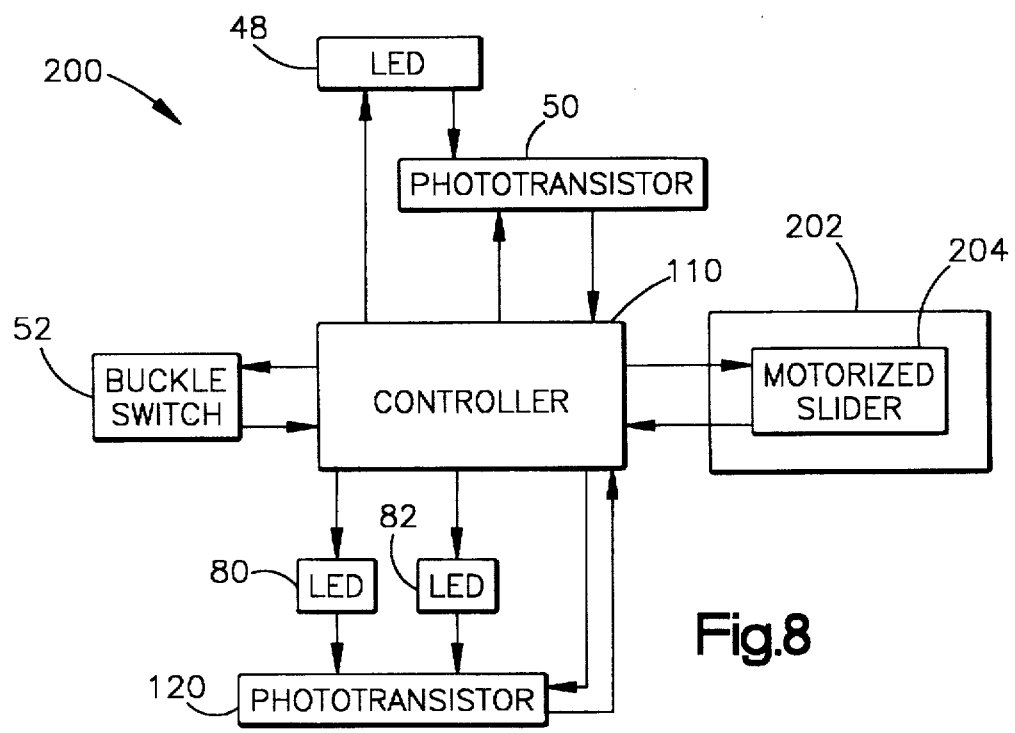
FIG. 8 is a block diagram showing parts of a vehicle occupant protection apparatus comprising a second embodiment of the present invention.

An apparatus 200 comprising a second embodiment of the present invention is shown schematically in FIG. 8. The apparatus 200 has many parts that are substantially the same as corresponding parts of the apparatus 10 described above. This is indicated by the use of the same reference numbers for such corresponding parts in FIGS. 8 and 7. However, the apparatus 200 includes an alternative height adjuster 202 with a motorized slider 204, whereas the apparatus 10 includes the height adjuster 14 with the manually operable slider 40 (FIGS. 2 and 3). The motorized slider 204 also may have any suitable structure known in the art.

In the apparatus 200, the controller 110 actuates the motorized slider 204 so that the height adjuster 202 will move a corresponding shoulder belt section of seat belt webbing until the output of either one of the phototransistors 50 and 120 indicates to the controller 110 that the shoulder belt section has been moved to a preferred position. This preferably occurs upon movement of the motorized slider 204 downward from an uppermost position.

From the above description of the invention, those skilled in the art will perceive improvements, changes and modifications. Such improvements, changes and modifications within the skill of the art are intended to be covered by the appended claims.

Having described the invention, we claim the following:

1. Apparatus comprising:

a field effect device;

a field source device which, when energized, provides a field that energizes said field effect device; and, seat belt webbing which is movable to a predetermined position in which said webbing extends into said field to affect said field in a predetermined manner;

said field effect device having a first output when said webbing is not in said predetermined position and having a second, different output when said webbing is in said predetermined position.

2. Apparatus as defined in claim 1 wherein said webbing is interposed between said field effect device and said field source device to shield said field effect device from said field when said webbing is in said predetermined position.

3. Apparatus as defined in claim 1 wherein said field source device is a light source and said field effect device is a photosensitive device.

4. Apparatus as defined in claim 3 wherein said photosensitive device is a phototransistor.

5. Apparatus as defined in claim 1 further comprising an indicator system which, when actuated, alerts a vehicle occupant to the position of said webbing, and a controller which actuates said indicator system in response to said outputs of said field effect device.

6. Apparatus as defined in claim 5 wherein said indicator system provides a visual indication of said position of said webbing.

7. Apparatus as defined in claim 6 wherein said visual indication is a light signal.

8. Apparatus as defined in claim 1 further comprising means for deploying a vehicle occupant protection device in a first mode in response to said first output and in a second, different mode in response to said second output.

9. Apparatus as defined in claim 8 wherein said protection device is a seat belt pretensioner.

10. Apparatus comprising:

a source of light;

a photosensitive device responsive to said light;

seat belt webbing; and, a height adjuster which is actuatable to move a shoulder belt section of said webbing to a predetermined position in which said shoulder belt section shields said photosensitive device from said light;

said photosensitive device having a first output when said shoulder belt section is not in said predetermined position and having a second, different output when said shoulder belt section is in said predetermined position.

11. Apparatus as defined in claim 10 wherein said shoulder belt section of said webbing has a predetermined orientation relative to a vehicle occupant's shoulder when in said predetermined position.

12. Apparatus as defined in claim 10 wherein said photosensitive device is a phototransistor.

13. Apparatus as defined in claim 10 further comprising an indicator system which, when actuated, alerts a vehicle occupant to the position of said shoulder belt section of said webbing, and a controller which actuates said indicator system in response to said outputs of said photosenstive device.

14. Apparatus as defined in claim 13 wherein said indicator system provides a visual indication of said position of said shoulder belt section of said webbing.

15. Apparatus as defined in claim 14 wherein said visual indication is a light signal.

16. Apparatus as defined in claim 10 wherein said height adjuster includes a motorized slider, said apparatus further comprising a controller which actuates said motorized slider in response to said output of said photosensitive device.

17. Apparatus as defined in claim 10 further comprising means for deploying a vehicle occupant protection device in a first mode in response to said first output and in a second, different mode in response to said second output.

18. Apparatus as defined in claim 17 wherein said protection device is a seat belt pretensioner.

19. A method comprising the steps of:

energizing a field effect device with a field provided by a field source device;

moving seat belt webbing between a plurality of positions including a predetermined position; and, indicating whether or not said webbing is in said predetermined position;

said indicating step comprising switching said field effect device between differently energized conditions by moving said webbing into said field when moving said webbing between said positions.

20. A method as defined in claim 19 wherein said energizing step comprises energizing a photosensitive device with light emitted by a light source, said switching step comprising shielding said photosensitive device from said light by interposing said webbing between said photosensitive device and said light source.

21. A method as defined in claim 19 wherein said step of moving said seat belt webbing between said positions comprises moving a shoulder belt section of said webbing between a plurality of orientations including a predetermined orientation relative to a vehicle occupant's shoulder.

* * * * *